Patented Jan. 7, 1936

2,027,178

UNITED STATES PATENT OFFICE 2,027,178

DISAZO DYESTUFFS AND THEIR PRODUCTION

Arthur Howard Knight, Ashton-on-Mersey, Sale, England, assignor to Imperial Chemical Industries Limited, a corporation of Great Britain No Drawing. Application March 8, 1934, Serial No. 714,736. In Great Britain March 11, 1933

8 Claims. (Cl. 260—84)

According to the present invention new disazo dyestuffs are obtained by coupling a diazotized nitroaniline or homologue or substitution derivative thereof devoid of salt forming groups such as sulpho or carboxy with a 2.5-dialkoxy aniline as defined below, again diazotizing the so-formed aminoazo compound, and coupling the so-obtained diazo compound with 1,5-aminonaphthol in an acid medium.

The 2,5-dialkoxyaniline used is represented by the formula

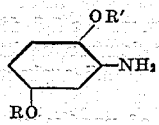

where R and R' are methyl, ethyl, propyl, butyl, the same or different.

The dyestuffs exhibit excellent affinity for cellulose esters and ethers. By a further feature of the invention cellulose esters and ethers are dyed in gray and black shades by application thereto of the new dyestuffs.

The dyestuffs are very sparingly soluble or insoluble in water and are applied in the form of an aqueous suspension. The dyeings so obtained possess good fastness properties.

Suitable first components are o-nitroaniline, p-nitroaniline, m-nitro-p-toluidine, o-chloro-p-nitroaniline, 5-nitro-o-anisidine.

The invention is illustrated, but not limited, by the following examples in which the parts are by weight.

Example 1

138 parts of o-nitroaniline are diazotized in the usual way and added to a solution of 153 parts of 2,5-dimethoxyaniline in 370 parts of 10% hydrochloric acid and 6000 parts of water. When coupling is complete about 1200 parts of water are added, the so-diluted suspension of monoazo compound is heated to 50° C., 76 parts of sodium nitrite are added, and the mixture stirred until diazotization is complete: the resulting solution is filtered if necessary and cooled to 15° C. It is then added to a solution of 159 parts of 1,5-aminonaphthol in 370 parts of 10% hydrochloric acid and 8000 parts of water. The mixture is stirred until combination is complete when the suspension is made alkaline to red litmus and the dyestuff, which is out of solution, is filtered off and preserved as a paste.

It has good affinity for cellulose acetate, which it dyes in bluish-gray shades of good fastness to light and washing, which have very good dischargeability.

Example 2

138 parts of p-nitroaniline are diazotized in the usual way and added to a solution of 153 parts of 2,5-dimethoxyaniline in 370 parts of 10% hydrochloric acid and 6000 parts of water. When the combination is complete about 18000 parts of water are added. The so-diluted suspension of monoazo compound is heated to 50–60° C. 76 parts of sodium nitrite are then added, the mixture being stirred until diazotization is complete, the diazoazo compound passing into solution. This solution is filtered if necessary and cooled to 20° C. It is then added to a solution of 159 parts of 1,5-aminonaphthol in 370 parts of 10% hydrochloric acid and 8000 parts of water and the mixture is stirred until combination is complete. The dyestuff suspension is then rendered alkaline with sodium carbonate and the dyestuff filtered off, washed with water, and preserved as paste or dried in any suitable way.

It dyes cellulose acetate in black shades of good fastness to light.

Example 3

172.5 parts of o-chloro-p-nitroaniline are diazotized in the known way and the solution of the diazo compound so obtained is added to a solution of 181 parts of 2,5-diethoxyaniline in 370 parts of 10% hydrochloric acid and 6000 parts of water. When combination is complete the monoazo compound is filtered off, washed with water and resuspended in 12000 parts of water containing 925 parts of 10% hydrochloric acid with stirring. The monoazo suspension so obtained is heated to 60° C. and 76 parts of sodium nitrite are added. Stirring is continued until diazotization is complete, the diazoazo compound passing into solution. The solution of the diazoazo compound is then filtered from any insoluble matter and the filtrate cooled to 20° C. The diazoazo solution is then added to 159 parts of 1,5-amino-naphthol in 8000 parts of water and 370 parts of 10% hydrochloric acid with good agitation. When combination is complete the dyestuff suspension is rendered alkaline with sodium carbonate, the dyestuff filtered off, washed with water, and preserved as paste or dried in any suitable way. It dyes cellulose acetate in gray shades of good fastness to light and washing.

In the claims below it should be understood that where new compounds, products or dyestuffs are claimed, I intend to cover these not only in substance, but also in whatever state they exist when applied to materials dyed, printed or pigmented therewith.

I claim:

1. An azo compound represented by the formula

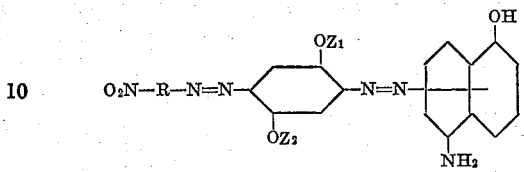

wherein R is an arylene radical of the benzene series without water-solubilizing groups, while $Z_1$ and $Z_2$ individually represent lower alkyl groups.

2. An azo dyestuff represented by the formula

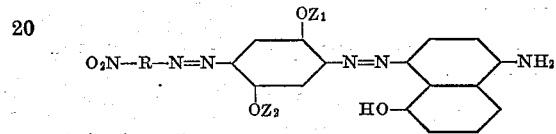

wherein R is an arylene radical of the benzene series free of sulfo and carboxy group, and $Z_1$ and $Z_2$ individually represent alkyl groups of the series comprising methyl, ethyl, propyl and butyl, the two being alike or different, said dyestuffs being characterized by dyeing cellulose ester material in bluish-gray to black shades.

3. An azo dyestuff represented by the formula

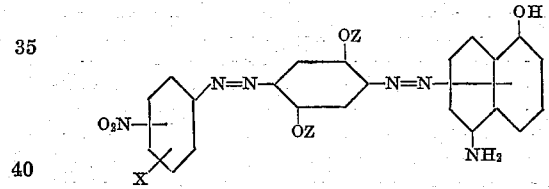

wherein Z stands for methyl, ethyl, propyl or butyl, and X stands for hydrogen, halogen, alkyl or alkoxy, said dyestuff being substantially identical with the one obtainable by coupling a diazo-azo compound of the general formula

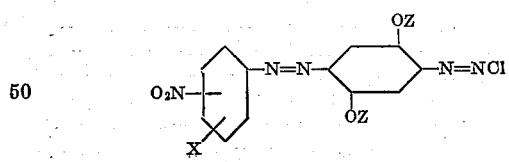

in which Z represents methyl, ethyl, propyl, or butyl with 1,5-aminonaphthol in acid medium.

4. The dyestuff resulting from coupling the diazoazo compound of the formula

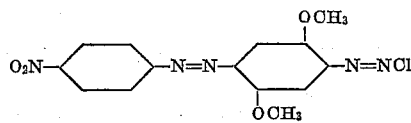

with 1,5-aminonaphthol in acid medium.

5. The dyestuff resulting from coupling the diazo-azo compound of the formula

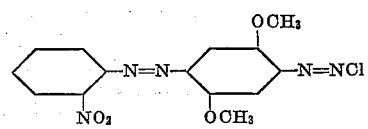

with 1,5-aminonaphthol in acid medium.

6. The dyestuff resulting from coupling the diazo-azo compound of the formula

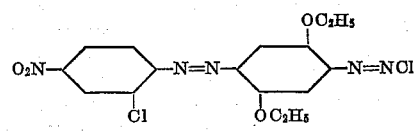

with 1,5-aminonaphthol in acid medium.

7. The process of producing a disazo dyestuff adapted to dye cellulose acetate material, which comprises coupling a diazotized nitroarylamine of the benzene series, which is free of water-solubilizing groups, with a 2,5-dialkoxyaniline, rediazotizing the so-formed amino-azo compound, and coupling it to 1,5-aminonaphthol in acid medium.

8. The process of producing a disazo dyestuff adapted to dye cellulose acetate material, which comprises coupling a diazo-azo compound of the general formula

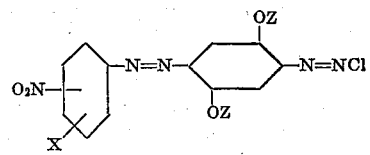

wherein X stands for hydrogen, halogen, alkyl or alkoxy, and Z stands for a lower alkyl group, with 1,5-aminonaphthol in an acid medium.

ARTHUR HOWARD KNIGHT.